Patented Sept. 11, 1951

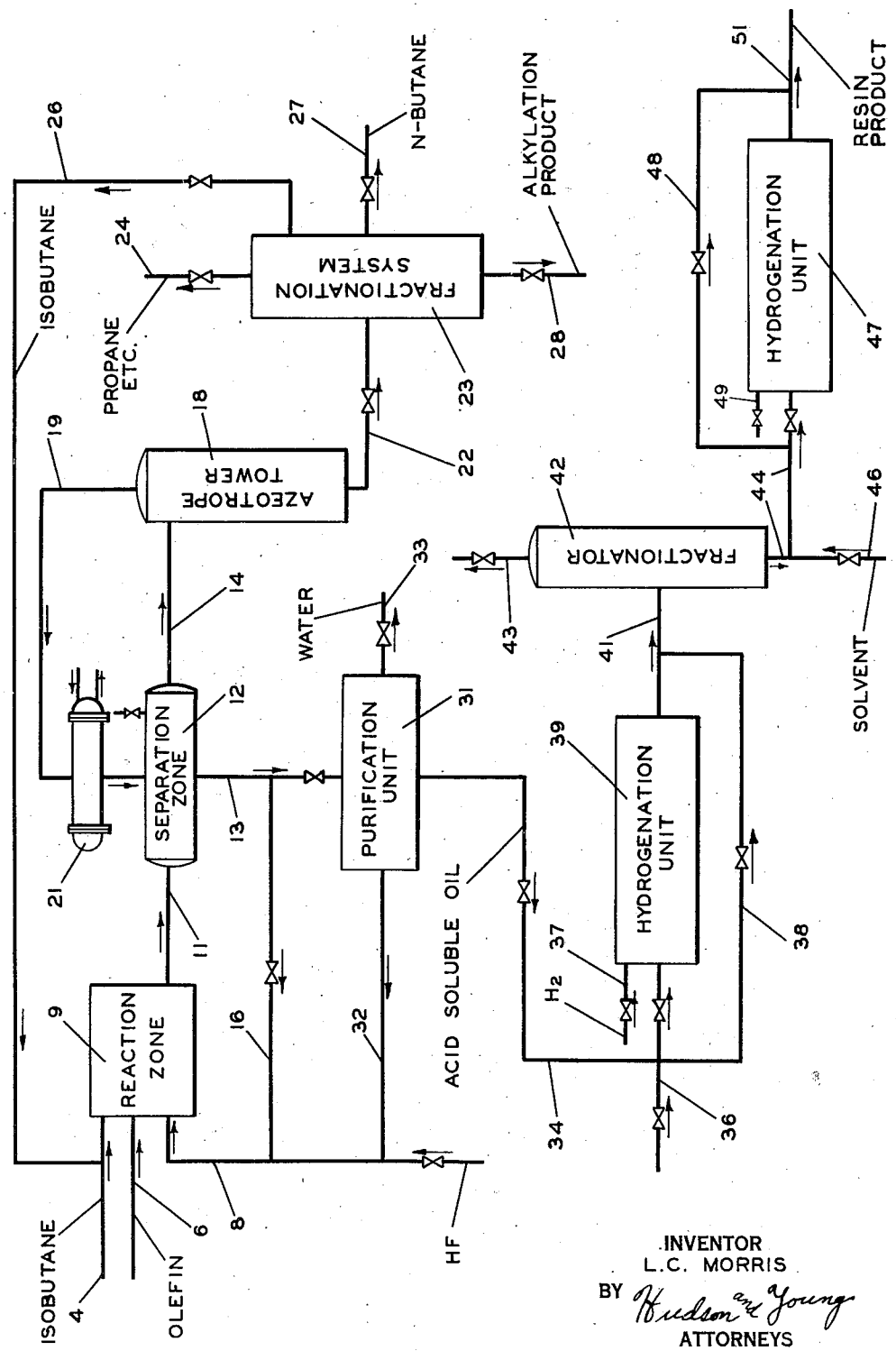

2,567,342

UNITED STATES PATENT OFFICE 2,567,342

RESINOUS PRODUCTS FROM HF ACID-SOLUBLE OILS

Lloyd Clayton Morris, Bartlesville, Okla., assignor to Phillips Petroleum Company, a corporation of Delaware Application September 23, 1946, Serial No. 698,638

8 Claims. (Cl. 260—96)

This invention relates to the conversion of hydrocarbons. In one aspect this invention relates to the conversion of acid-soluble oils. In another aspect this invention relates to the utilization of acid-soluble oils obtained as a by-product from a hydrofluoric acid alkylation process. In still another aspect this invention relates to the manufacture of a solid hydrocarbon resin.

In the conversion of hydrocarbons in the presence of inorganic acid catalysts, such as hydrofluoric acid or sulfuric acid, acid-soluble oils are formed as by-products of the conversion reaction and are present in the acid phase of the conversion process. Perhaps one of the most important of such conversion processes in which acid-soluble oils are formed is the alkylation of hydrocarbons in the presence of hydrofluoric acid as the catalyst. This so-called hydrofluoric acid alkylation involves the reaction of an isoparaffin, particularly isobutane and/or isopentane, with an alkylating reactant, particularly an olefin, such as propylene, various butylenes, various amylenes and other higher boiling olefins, to produce normally liquid paraffins which generally have high octane numbers and are quite valuable as constituents of aviation fuel. In such alkylation processes the reactants are intimately contacted at temperatures between about 50 and about 150° F. and under sufficient pressure to maintain reactants in the liquid phase with liquid concentrated hydrofluoric acid for a reaction period ranging from about 1 to about 30 minutes. The mole ratio of paraffin to olefin in the feed is usually from about 3:1 to about 20:1, and may be as high as 100:1 in the reaction zone itself. The resulting reaction effluent is passed to a settling zone wherein a liquid hydrocarbon-rich phase and a heavier liquid hydrofluoric acid-rich phase are formed and separated.

The hydrocarbon phase from the settling zone is then subjected to fractional distillation to remove hydrogen fluoride dissolved therein, which is generally present to the extent of about 1 to about 3 per cent by volume. After removal of the hydrogen fluoride from the hydrocarbon phase, the remaining portion of the hydrocarbon phase is passed to a separation or distillation zone for the removal and recovery of the alkylation product. This product of the process comprises, in general, alkylated hydrocarbons, such as iso-octanes, heptanes and hexanes and some pentanes, of high anti-knock quality.

The acid phase from the separation zone is recycled directly to the alkylation reaction zone; however, since the acid phase becomes contaminated with water and other impurities, a portion of the acid phase is passed to a purification system for the removal of water and other impurities. One of the impurities besides water which is removed from the acid phase in the purification system is the so-called acid-soluble oils. These acid-soluble oils, which are referred to in the copending application of Frederick E. Frey, Serial No. 429,961, filed February 7, 1942, now U. S. Patent 2,494,867, and which are a by-product of the alkylation reaction, vary considerably in composition but are, in general, normally liquid materials and are soluble in hydrogen fluoride and partially soluble in water and in hydrocarbons. They appear to have a tendency to reduce the catalytic activity of the hydrofluoric acid and to vary the course of alkylation reaction, thus necessitating their removal from the acid phase of the alkylation process. The amount of these acid-soluble oils which is formed may amount to about 1 to 2 percent to as high as about 10 per cent of the acid phase. A typical acid-soluble oil has the following characteristics:

Table I

| | |
|---|---:|
| A. P. I. gravity @ 60° F. | 22.7 |
| Viscosity, S. U. S. @ 100 F. | 390 |
| Viscosity, S. U. S. @ 210 F. | 61 |
| Flash point, C. O. C., °F. | 205 |
| Fire point, C. O. C., °F. | 220 |
| Pour point, °F. | 5+ |
| Total solids, A. S. T. M. D154, percent | 67 |
| Iodine No., Wijs (pure oil modif.) g. $I_2$/100 g. oil | 167 |
| Polymer color | 2— |
| Free HF | none |
| Water, percent | trace |
| Sulfur, percent | 0.011 |
| Combined fluorine, percent | 0.081 |

The sulfur in this acid-soluble oil probably originates for the most part from impurities present in the hydrocarbons treated and in smaller part from the hydrofluoric acid used in the particular alkylation.

Several methods are known to those skilled in the art for removing water and acid-soluble oils from the acid phase. A typical and generally used method comprises passing the acid phase to a series of distillation columns. The first column comprises, in general, a flash distillation column in which hydrogen fluoride and water pass overhead as a vapor and acid-soluble oils containing some free hydrogen fluoride are removed as a bottom product. The hydrogen fluoride and water overhead is passed to the second distillation column in which substantially anhydrous hydrogen fluoride is removed as an overhead fraction and a liquid azeotropic mixture of water and hydrogen fluoride is removed as a bottom fraction. The anhydrous hydrogen fluoride overhead fraction is recycled to the reaction zone and the azeotropic mixture of hydrogen fluoride and water is usually discarded or further treated to recover the hydrogen fluoride therefrom. In another method for removing water and acid-soluble oils from the acid phase, a single distillation of the acid phase is effected. Substantially anhydrous hydrogen fluoride is removed overhead from the distillation and acid-soluble oils, water and some hydrogen fluoride are removed as a bottom product of the distillation. The acid-soluble oils are separated from the bottom product by settling, which settling results in the formation of an acid-soluble oil phase and a heavier aqueous hydrogen fluoride phase. The recovery of acid-soluble oils by this latter method is more fully described in the copending application of D. E. Bergen, Serial No. 672,475, filed May 27, 1946, now U. S. Patent 2,493,384. This invention constitutes a process for utilization of the acid-soluble oil by-product recovered in the acid purification system.

The object of this invention is to provide a novel hydrocarbon conversion process.

Another object is to provide a process for the conversion of acid-soluble oils in the presence of a catalyst.

Another object of this invention is to provide a method for decreasing the operational and material cost of an alkylation process.

Still a further object of this invention is to provide an integrated alkylation process in which an alkylation by-product of a first alkylation reaction is converted in a second reaction to produce a valuable product.

Still another object of this invention is to provide a process for the manufacture of a high quality solid hydrocarbon resin.

It is yet another object to provide a novel resinous composition.

Yet a further object is to provide a process for the hydrogenation of acid-soluble oils.

Further objects and advantages will become apparent to those skilled in the art from the accompanying description and disclosure.

According to this invention a normally liquid acid-soluble oil fraction is distilled to remove volatile components and leave a solid resinous residue. The resinous residue obtained by the distillation of an acid-soluble oil fraction is clear and brown in color and is substantially completely soluble in paraffinic and aromatic hydrocarbon solvents. Hardness of the resin produced according to this invention depends to a large extent upon the distillation conditions, but, in general, ranges from a relatively plastic to a relatively brittle mass. The softer resins are slightly tacky while in the harder resins this property is not apparent. In general the iodine number (Wijs method) is in the range between about 140 and about 180 and will generally average between about 150 and about 165. Such resins form a clear solution in drying oils, such as linseed oil, and may be used in the compounding of paint.

The distillation of the normally liquid acid-soluble oil fraction, such as that obtained as a by-product of the acid purification of an alkylation process using a fluorine-containing catalyst, is effected at a pressure less than about 100 mm. of mercury and preferably between about 5 and about 15 mm. of mercury and at a kettle temperature, which depends upon the pressure and upon extent of removal of volatile components, between about 350 and about 600° F. The yield of product depends upon the type of resin desired and will vary between about 45 per cent for a plastic product and about 20 per cent for a hard brittle resinous product. In other words between about 55 and about 80 per cent of the acid-soluble oil fraction is distilled overhead during the distillation. It is necesary that the temperature and pressure of distillation be such that substantially no decomposition of the desired resinous product takes place.

In a modification of the present invention in which a lighter resinous product is produced the acid-soluble oil fraction containing resinous material is hydrogenated prior to distillation or, alternatively, the resinous product obtained from the distillation is hydrogenated. In the latter case where the solid resinous product of the distillation step is hydrogenated, the solid products may be dissolved in a suitable solvent to enable its flow through the hydrogenation step. Hydrogenation is effected in the presence of a hydrogenation catalyst, such as molybdenum sulfide, nickel and the like, and in the presence of hydrogen. A residence time of from about 0.5 to about 5 hours is used, and a temperature between about 200 and about 750° F. and a pressure between about 1,000 and 2,500 pounds per square inch gage are appropriate. The degree of hydrogenation should be sufficient to reduce color but not enough to alter subtantially the hardening properties of the resins. The decolorized product obtained by the hydrogenation of the acid-soluble oil fraction is distilled to remove volatile components and to leave a solid resinous material of a lighter color and of improved quality from that obtained without hydrogenation. When the solid resinous product obtained from the distillation of the original acid-soluble oil fraction is hydrogenated, no distillation of the hydrogenated product is required unless a solvent has been used.

The acid-soluble oil fraction which is distilled to produce a solid resin product in the manner heretofore described has an A. P. I. gravity between about 15 and about 30 degrees and an iodine number (a measurement of unsaturation) between about 100 and about 175. Generally, the 10 to 90 volume per cent boiling range, determined by vacuum distillation and corrected to 760 mm. pressure, is within the range from about 300 to about 1,000° F. The color of the acid-soluble oil fractions vary from light yellow to a dark red.

The invention may perhaps be more adequately understood by reference to the accompanying drawing and description thereof. The drawing represents diagrammatically a preferred arrangement of apparatus elements and flow of material therethrough in which the process of the present invention may be practiced. While the elements essential to the understanding of the invention are shown in the drawing, it will be appreciated that various auxiliary pieces of equipment may be provided by one skilled in the art without departing from the scope of this invention.

In this invention as applied to the alkylation of an alkylatable hydrocarbon, such as isobutane, with an olefin in the presence of a fluorine-containing catalyst, such as hydrogen fluoride, a suitable and typical feed stock for the hydrofluoric acid alkylation in which the acid-soluble oils are a by-product appears in Table II below:

Table II

| Component: | Mol per cent |
|---|---|
| Isobutane | 68 |
| Isobutylene | 4 |
| Normal butylene | 7 |
| Butane | 20 |
| Other hydrocarbons | 1 |
| | 100 |

Such a hydrocarbon feed enters reaction zone 9 as a liquid through lines 4 and 6 and is intimately contacted with liquid hydrofluoric acid, which enters through line 8 and which has a titratable acidity of about 80 to about 95 per cent by weight. The overall mol ratio of isoparaffin to olefin is usually from about 4:1 to about 20:1 in the combined feed and recycle (line 26) and much higher in the reaction zone. The time of residence of the reaction mixture in the reaction zone 9 is usually from about 5 to about 15 minutes but it may be for shorter or longer periods as desired. The volume ratio of acid to hydrocarbon is between approximately 0.5:1 and about 2:1, generally about 1:1, although other ratios may be maintained. The hydrocarbon feed stock enters the alkylation process at a temperature of about 80 to about 100° F. and a pressure of about 90 to 100 pounds per square inch gage. Should it be desired however, both higher pressures and higher temperatures may be used. In general, only sufficient pressure to assure liquid phase operation is necessary. From reaction zone 9 a hydrocarbon conversion effluent is passed by line 11 to separation zone 12 in which the effluent separates into two liquid phases, namely, a lighter hydrocarbon-rich phase and a heavier hydrogen fluoride-rich phase. The hydrogen fluoride-rich phase is withdrawn from the bottom of separation zone 12 through line 13 to be recycled as a catalyst for the alkylation reaction through lines 16 and 8. Fresh make-up hydrofluoric acid may be added to the system through line 8, when desired. Since it is desirable to remove water and acid-soluble oils from the acid phase in order to assure the proper function of the catalyst as well as to recover acid-soluble oils as a by-product, a portion or all of the hydrogen fluoride phase is passed to a purification unit 31, the operation of which will be discussed hereinafter. In purification unit 31 water and acid-soluble oils are removed through lines 33 and 34, respectively. A purified anhydrous acid phase is passed from purification unit 31 through lines 32 and 8 to the reaction zone 9.

The liquid hydrocarbon-rich phase passes from separation zone 12 through line 14 to azeotrope tower 18. Separation of a vaporous azeotropic mixture of hydrocarbon and hydrogen fluoride from the hydrocarbon phase is effected in azeotrope tower 18. The azeotropic mixture passes as a vapor from tower 18 through line 19 and condenser 21 to separation zone 12. A liquid hydrocarbon stream substantially free from hydrogen fluoride but containing a small amount of organic fluorine compounds is removed from the bottom of azeotrope tower 18 by means of line 22 and is passed to a bauxite treater (not shown). The organic fluorine compounds, which are formed as by-products of the hydrocarbon conversion, are removed by treatment with the bauxite.

The liquid hydrocarbon stream, substantially free from organic fluorine compounds, passes through line 22 to fractionating system 23, which may represent either a single deisobutanizer or a series of fractionators for the separation and recovery of the various products of the hydrocarbon conversion. The liquid hydrocarbon stream in line 22 has approximately the composition shown in Table III at this point in the process.

Table III

| Hydrocarbon component: | Mol per cent |
|---|---|
| Propane and lighter hydrocarbons | 1 |
| Isobutane | 57 |
| Normal butane | 20 |
| Alkylate | 22 |
| | 100 |

A relatively light hydrocarbon fraction is removed from fractionation system 23 through line 24. This light fraction removed through line 24 comprises propane and lighter hydrocarbons and may be vented or used as fuel. Another fraction containing primarily isobutane is removed from fractionating system 23 through line 26 and is recycled to reaction zone 9. A normal butane fraction is removed from fractionation system 23 through line 27 and may be utilized as a fuel, etc., or passed to an isomerization system (not shown) for the isomerization of the normal butane to isobutane for use in the alkylation reaction. The alkylation product of the process is withdrawn from fractionation system 23 through line 28. This alkylation product comprises a relatively light alkylate fraction containing iso-octanes, heptanes and hexenes, and a relatively heavy alkylate by-product fraction. The heavy alkylate by-product may be separated from the light alkylate product in another fractionation zone (not shown).

Purification unit 31 may comprise any suitable method and apparatus known to those skilled in the art for the removal and separation of water and acid-soluble oils from the acid phase. Unit 31 may be a series of distillation steps, the first step of which removes the acid-soluble oils from the acid phase as a bottom product, or unit 31 may comprise a single distillation step in which the acid-soluble oils are removed together with water as a bottom product.

The properties of a typical acid-soluble oil fraction recovered from purification unit 31 through line 34 is shown in Table I hereinbefore. The acid-soluble oil fraction constitutes about 8 to about 9 weight per cent of the total acid phase.

In accordance with this invention an acid-soluble oil fraction, such as that recovered from purification unit 31, is passed through lines 36 or 34, 38 and 41 to fractionation unit 42, in which fractionation unit the acid-soluble oil fraction is distilled to remove volatile constituents through overhead line 43. The bottom product of fractionator 42 which comprises the resinous product of this invention is withdrawn therefrom through lines 44, 48 and 51. Under the conditions of subatmospheric pressure and elevated temperatures being used in fractionator 42 this bottom product is in the liquid phase but when cooled to atmospheric conditions it becomes a solid. Fractionator 42 is operated at a pressure between about 5 and about 15 mm. of mercury and at a kettle temperature between about 350 and about 600° F.

According to the modification of this invention in which hydrogenation is employed, an acid-soluble oil phase from purification unit 31 is passed through lines 34 and 36 to hydrogenation unit 39. The acid-soluble oil fraction is hydrogenated in the presence of a catalyst, such as nickel, and in the presence of hydrogen, which enters through line 37, at a temperature between about 200 and 750° F. and a pressure between 1,000 and 2,500 pounds per square inch gage. As previously discussed, the residence time is between about 0.5 to about 5 hours. Hydrogenation products from unit 39 are passed through line 41 to fractionator 42 where the hydrogenation product is distilled to recover a resinous product. Volatile components are withdrawn from fractionator 42 through line 43 and the resinous product is drawn from the bottom through lines 44, 48 and 51.

In some instances it may be more desirable to first distill and remove volatile components from the acid-soluble oil fraction from unit 31 and then hydrogenate the resinous bottom fraction from the distillation. In such a case, acid-soluble oils from unit 31 are passed through lines 34 and 41, to fractionator 42, by-passing unit 39 via line 38. As before, volatile components of the acid-soluble oil fraction are withdrawn from fractionator 42 through lines 43 and a resinous bottom product is withdrawn from fractionator 42 through line 44. In many cases the resinous product withdrawn from fractionator 42 through line 44 will be a solid or at least a very viscous material under the conditions of hydrogenation. This bottom fraction may, therefore, be dissolved in a solvent which passes into line 44 through line 46. The resulting liquid mixture is then passed to hydrogenation unit 47 through line 44 where it is hydrogenated in the presence of a catalyst and in the presence of hydrogen, which enters through line 49. The hydrogenated resinous product from hydrogenation unit 47 is withdrawn through line 51 and when necessary excess solvent and volatile components are removed by distillation (not shown). In this latter modification of the present invention it is frequently unnecessary to dilute the bottom resinous fraction from fractionator 42 with a solvent since this fraction is often a liquid at the hydrogenation conditions of unit 47 and distillation of the hydrogenated resinous product withdrawn through line 51 is eliminated. The product obtained by the combination of distillation and hydrogenation is of a lighter color and improved quality compared to the product obtained without hydrogenation but with distillation alone.

The following examples are offered for a better understanding of the nature and application of invention and are not considered unnecessarily limiting to the invention.

EXAMPLE I

Isobutane was alkylated with butylene in the presence of hydrofluoric acid at about 90° F. and under a pressure of about 100 pounds per square inch gage to produce an alkylate product boiling within the gasoline range. The overall mol ratio of isobutane to butylene was about 6:1 and the contact time about 10 minutes; the volume ratio of hydrocarbon to acid was about 1:1 and the acidity of the acid phase was about 85 to 90 weight per cent. Acid-soluble oils amounting to about 10 per cent of the acid phase were recovered and vacuum distilled with the following results which are typical of the distillation properties of such fractions.

[Vacuum distillation corrected to 760 mm. pressure.]

| Vol. Per Cent Distilled | Overhead Temp., °F. |
|---|---|
| 10 | 400 |
| 30 | 545 |
| 50 | 655 |
| 70 | 775 |
| 90 | 940 |

EXAMPLE II

Isobutane was alkylated with a $C_6$ hydrocarbon and heavier fraction in the presence of hydrofluoric acid. The alkylation conditions and the composition of the $C_6$ and heavier hydrocarbon fraction are shown below:

Composition of hydrocarbon feed, wt. per cent

| | |
|---|---|
| Propane | 0.1 |
| Isobutane | 42.6 |
| Normal butane | 1.1 |
| Hexenes | 8.5 |
| Hexanes | 21.3 |
| Heptenes | 2.9 |
| Heptanes | 5.5 |
| Octenes | 3.7 |
| Octanes | 9.7 |
| Nonenes | 0.6 |
| Nonanes | 2.3 |
| Decenes and undecenes | 0.1 |
| Decanes and undecanes | 0.8 |
| Heavier hydrocarbons | 0.8 |
| | 100.0 |
| Average mol. wt. of olefins | 95.4 |
| Mol. ratio of isobutane to olefin | 4.4 |
| Temp., °F. | 91 |
| Pressure, p. s. i. g. | 140 |
| Contact time, minutes | 10.3 |
| Vol. ratio of acid to hydrocarbon | 1.15:1 |
| Acidity of acid phase, wt. per cent | 81 |
| Acid-soluble oil, wt. per cent of acid phase | 10.4 |

The recovered acid-soluble oil was vacuum distilled with the following results:

[Vacuum distillation corrected to 760 mm. pressure.]

| Overhead Temp., °F. | Vol. Per Cent Distilled |
|---|---|
| 320 | 10 |
| 455 | 30 |
| 565 | 50 |
| 650 | 70 |
| 750 | 90 |

From Examples I and II, the similarity between the acid-soluble oils obtained from the alkylation of isobutane with a low-boiling olefin and with a relatively higher boiling olefin fraction is apparent. The yield of acid-soluble oil in both Examples I and II was about the same, about 10 weight per cent of the acid phase. In general, about 10 volume per cent of the acid-soluble oil fraction distills below about 300° F. and about 90 volume per cent below about 950 or 1000° F.

EXAMPLE III

Four samples of acid-soluble oil fraction from an HF alkylation process were distilled under about 10 mm. of mercury pressure to produce resins of varying degrees of hardness. The manner of operation and properties of the resinous products are shown in the following Table IV.

Table IV

| Sample No. | Yield, Wt. Per Cent of Charge | Distillation Temp., °F. | Softening Point, °F.[1] | Iodine No.[2] | | Ash |
|---|---|---|---|---|---|---|
| | | | | ½ hour Absorption | 1 hour Absorption | |
| 1 | 38 | 392 | 110 | 155 | 165 | Trace. |
| 2 | 27 | 450 | 131 | 155 | 170 | Do. |
| 3 | 23 | 550 | 138 | 160 | 170 | Do. |
| 4 | 17 | 570 | 163 | 160 | 170 | Do. |

[1] Ring and ball method—A. S. T. M., D-36-26.
[2] Wijs method—grams of iodine per 100 grams of sample.

The material distilled overhead from the acid-soluble oil fraction was colored at the beginning of the distillation and became brownish-green near the end of the distillation. At the end of the distillation in which the oil was reduced to 23 and 17 weight per cent of the charge, a very viscous pale green material was distilled overhead. This material is not a solid resin at room temperature. The iodine number of the low-boiling oils in the overhead is of the order of 150 to 175.

A comparison of the iodine number of 167 for the charge as exemplified in Table I with that of 155 to 160 of the resinous product shows a slight decrease in the iodine number of the resinous product as is determined by the pure oil modification of the Wijs method. This method specifies an absorption period of one-half hour. The iodine numbers are also listed for one hour absorption, the time specified in A. S. T. M. D-154-43 for the determination of iodine number of oleoresins by the Wijs method. The softening point is increased as the yield of resins is decreased. It is estimated that a yield of 20 weight per cent of the charge would produce a resin with a softening point of about 150° F.

The resins are clear and brown in color, slightly darker than a dark tan of wood resin. An attempt to compare the resins with color standards used in determining the color of oleoresins (A. S. T. M. D-154-43) shows the resins darker than No. 5, even in a solution of approximately 25 per cent resin in pentane. Sample 1 was a plastic, slightly tacky material. Samples 2, 3 and 4 were solid brittle material; however, resins 2 and 3 were slightly tacky. This would indicate that a resin of 20 or less weight per cent yield would have the properties of brittleness and non-tackiness. The ash of which there was less than 0.1 per cent in the resin, had the appearance of iron oxide and gave a qualitative test for iron when dissolved in hydrochloric acid. The acidity of the resin samples was negligible.

EXAMPLE IV

A solution of 35 per cent resin in linseed oil was made; the solution was transparent and free of turbidity or precipitative material. This showed that the resin was compatable with drying oils. The resin also was quite soluble in paraffinic and aromatic hydrocarbon solvents.

EXAMPLE V

A light-colored resin was produced by contacting an acid-soluble oil fraction from a hydrofluoric acid alkylation process with hydrogen and a nickel-on-kieselguhr catalyst at about 390° F. for a period of about 3 hours. A light yellow oil was obtained from the catalytic hydrogenation and was fractionaly distilled under reduced pressure to recover a light-colored resinous kettle product (amounting to about 33 per cent of the original material). The hydrogenated resin was lighter than No. 1 in a solution of about 25 per cent resin in pentane according to the standard test method A. S. T. M. D-154-43.

The product obtained by distilling the original acid-soluble oil fraction at reduced pressure was very dark in color, being between No. 5 and No. 6 in a solution of about 25 per cent resin in pentane according to method A.S.T.M. D-154-43.

Although this invention has been described with particular reference to the hydrocarbon conversion carried out in the particular manner, various modifications and applications will become apparent to those skilled in the art which may be practiced without departing from the scope of this invention.

I claim:

1. A process for producing a solid hydrocarbon resin which comprises passing an acid-soluble oil fraction obtained from the catalyst phase of a process for the alkylation of an alkylatable hydrocarbon in the presence of a catalyst comprising hydrofluoric acid to a hydrogenation zone, hydrogenating the acid-soluble oil fraction in the presence of a hydrogenation catalyst under hydrogenation conditions of temperature and pressure of about 200 to about 750° F. and about 1,000 to about 2,500 pounds per square inch gage, distilling the effluent of said hydrogenation under conditions of temperature and pressure such that at least 55 per cent of the effluent is distilled overhead, and recovering a normally solid hydrocarbon resin as a bottom product of said distillation.

2. A process for producing a solid hydrocarbon resin which comprises passing an acid-soluble oil fraction obtained from the catalyst phase of a process for the alkylation of an alkylatable hydrocarbon in the presence of a catalyst comprising hydrofluoric acid to a hydrogenation zone, hydrogenating the acid-soluble oil fraction in the presence of a hydrogenation catalyst under hydrogenation conditions comprising a temperature within the range of 200 to 750° F. and a pressure within the range of 1000 to 2500 pounds per square inch gage, distilling the effluent of said hydrogenation under conditions of temperature and pressure, and recovering a normally solid hydrocarbon resin as a bottom product of said distillation.

3. The solid resinous product resulting from the process of claim 1.

4. The process for producing a solid hydrocarbon resin which comprises distilling an acid-soluble oil fraction, obtained from the acid phase of an alkylation process using a hydrofluoric acid catalyst, under a subatmospheric pressure less than about 100 mm. of mercury and at a kettle temperature between about 350 and about 600° F. to remove volatile constituents, recovering a resinous bottom fraction from said distillation, hydrogenating said resinous bottom fraction in the presence of a hydrogenation catalyst under hydrogenation conditions of a temperature between about 200 and about 750° F. and at a pressure between about 1,000 and about 2,500 pounds per square inch gage, and recovering a normally solid resinous product from said hydrogenation as a product of the process.

5. The process for producing a solid hydrocarbon resin which comprises distilling an acid-soluble oil fraction, obtained from the acid phase of an alkylation process using a hydrofluoric acid catalyst, under a subatmospheric pressure to remove volatile constituents, recovering a resinous bottom fraction from said distillation, hydrogenating said resinous bottom fraction in the presence of a hydrogenation catalyst under hydrogenation conditions of a temperature between about 200 and about 750° F. and at a pressure between about 1,000 and about 2,500 pounds per square inch gage, and recovering a normally solid resinous product from said hydrogenation as a product of the process.

6. The process for producing a solid hydrocarbon resin which comprises distilling an acid-soluble oil fraction, obtained from the acid phase of an alkylation process using a hydrofluoric acid catalyst, under a subatmospheric pressure less than about 100 mm. of mercury and at a kettle temperature between about 350 and about 600° F. to remove volatile constituents, recovering a resinous bottom fraction from said distillation, hydrogenating said resinous bottom fraction in the presence of a hydrogenation catalyst under hydrogenation conditions comprising a temperature within the range of 200 to 750° F. and a pressure within the range of 1000 to 2500 pounds per square inch gage, and recovering a normally solid resinous product from said hydrogenation as a product of the process.

7. The solid resin resulting from the process of claim 4.

8. A process for producing a solid hydrocarbon resin which comprises hydrogenating an acid-soluble oil fraction, obtained from the acid phase of an alkylation process using a hydrofluoric acid catalyst, in the presence of a hydrogenation catalyst under hydrogenation conditions comprising a temperature within the range of 200 and 750° F. and a pressure within the range of 1000 and 2500 pounds per square inch gage.

LLOYD CLAYTON MORRIS.

REFERENCES CITED

The following references are of record in the file of this patent:

UNITED STATES PATENTS

| Number | Name | Date |
|---|---|---|
| 2,092,889 | Mikeska | Sept. 14, 1937 |
| 2,152,533 | Carmody | Mar. 28, 1939 |
| 2,180,367 | Rostler | Nov. 21, 1939 |
| 2,293,208 | Lazar | Aug. 18, 1942 |
| 2,301,335 | Showalter et al. | Nov. 10, 1942 |
| 2,392,962 | Abrams | Jan. 15, 1946 |
| 2,404,393 | Mayland | July 23, 1946 |
| 2,440,459 | Bloch | Apr. 27, 1948 |
| 2,440,477 | Johnstone | Apr. 27, 1948 |